United States Patent
Kassner et al.

(10) Patent No.: US 11,354,766 B2
(45) Date of Patent: Jun. 7, 2022

(54) APPARATUS, COMPUTER PROGRAM PRODUCT, SIGNAL SEQUENCE, MEANS OF TRANSPORT AND METHOD FOR ASSISTING A USER IN FINDING A SUITABLE FELLOW PASSENGER

(71) Applicant: VOLKSWAGEN AKTIENGESELLSCHAFT, Wolfsburg (DE)

(72) Inventors: Astrid Kassner, Berlin (DE); Joel Rozada, Gothenburg (SE); Fredrik Andresen, Kållered (SE)

(73) Assignee: Volkswagen Aktiengesellschaft

( * ) Notice: Subject to any disclaimer, the term of this patent is extended or adjusted under 35 U.S.C. 154(b) by 267 days.

(21) Appl. No.: 16/471,622

(22) PCT Filed: Dec. 22, 2016

(86) PCT No.: PCT/EP2016/082389
§ 371 (c)(1),
(2) Date: Jul. 27, 2019

(87) PCT Pub. No.: WO2018/113976
PCT Pub. Date: Jun. 28, 2018

(65) Prior Publication Data
US 2019/0370924 A1    Dec. 5, 2019

(51) Int. Cl.
*G06Q 50/30* (2012.01)
*G01C 21/34* (2006.01)
*G06Q 10/04* (2012.01)

(52) U.S. Cl.
CPC ......... *G06Q 50/30* (2013.01); *G01C 21/3438* (2013.01); *G06Q 10/047* (2013.01)

(58) Field of Classification Search
CPC ... G06Q 50/30; G06Q 10/047; G01C 21/3438
USPC .......................................................... 705/13
See application file for complete search history.

(56) References Cited

U.S. PATENT DOCUMENTS

| | | | |
|---|---|---|---|
| 2014/0051465 A1* | 2/2014 | Ruys | G01C 21/3676 455/457 |
| 2017/0200321 A1* | 7/2017 | Hummel | G06Q 50/32 |
| 2019/0370922 A1* | 12/2019 | Asghari | G06Q 10/067 |

OTHER PUBLICATIONS

"Real-time Rideshare Matching Problem" Published by University of Maryland in Jan. 2010 (Year: 2010).*
Wu et al.; Peer-to-Peer Shared Ride Systems; Network and Parallel Computing; Lecture Notes in Computer Science; Oct. 1, 2006; pp. 252-270.
Search Report for International Patent Application No. PCT/EP2016/082389; dated Feb. 17, 2017.

* cited by examiner

*Primary Examiner* — Zeina Elchanti
(74) *Attorney, Agent, or Firm* — Barnes & Thornburg, LLP

(57) ABSTRACT

An apparatus, a computer program product, a signal sequence, a transportation vehicle and a method for assisting a user of a transportation vehicle in finding a suitable fellow passenger. The method includes receiving a ride request having a definition of a starting position and of a destination position, automatically comparing the ride request against a predefined route of the transportation vehicle and taking a result of the comparison as a basis for automatically deciding, based on a predefined reference, whether or not the ride request is made to the user.

30 Claims, 2 Drawing Sheets

APPARATUS, COMPUTER PROGRAM PRODUCT, SIGNAL SEQUENCE, MEANS OF TRANSPORT AND METHOD FOR ASSISTING A USER IN FINDING A SUITABLE FELLOW PASSENGER

PRIORITY CLAIM

This patent application is a U.S. National Phase of International Patent Application No. PCT/EP2016/082389, filed 22 Dec. 2016, the disclosure of which is incorporated herein by reference in its entirety.

SUMMARY

Illustrative embodiments relate to a device, a computer program product, a signal sequence, a transportation vehicle and a method for assisting a user of a transportation vehicle in finding a suitable fellow passenger. In particular, the illustrative embodiments relate to the avoidance of unnecessary data traffic and unnecessary user interactions.

BRIEF DESCRIPTION OF THE DRAWINGS

In the following, exemplary embodiments are described with reference to the attached drawings. Shown are.

DETAILED DESCRIPTION

Figure 1:
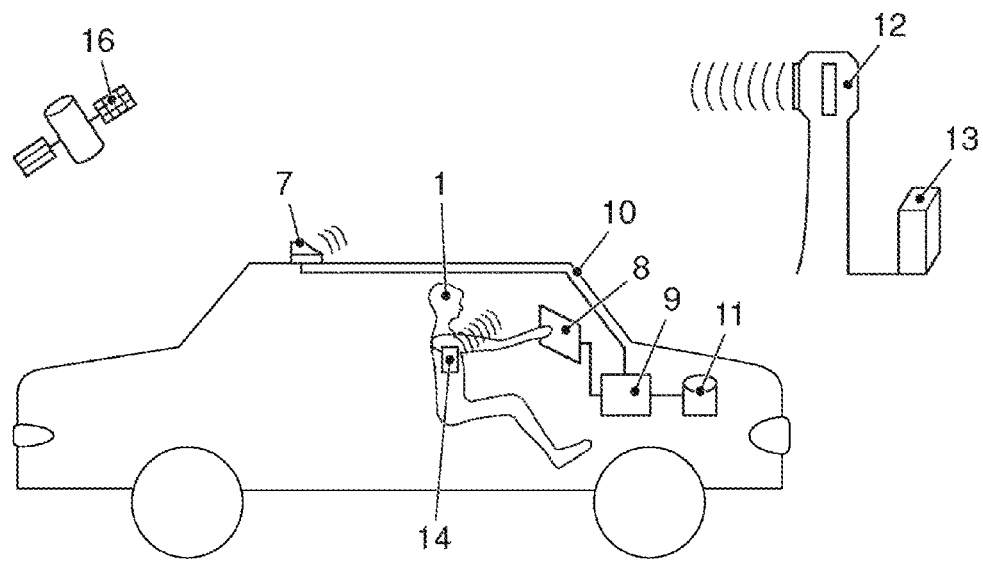
FIG. 1 is a schematic representation of an exemplary embodiment of a disclosed transportation vehicle with an exemplary embodiment of a disclosed device in an embodiment of a disclosed method for assisting a user in finding a suitable fellow passenger.

For some time now driving services offered online, such as Uber and Gett, have been very popular and offer many users of these services transparent information on the driver, the price and the availability (e.g., where the driver is located, how he/she has been rated, when he/she will arrive on site, etc.). Due to the fact that driving services are essentially based on the passenger's requested route, as is the case with conventional taxi rides, there is potential for optimization in terms of the economy and ecology of such driving services.

Disclosed embodiments satisfy this demand as identified above.

Disclosed embodiments provide a method for assisting a user of a transportation vehicle in finding a suitable fellow passenger. The user can be the driver or at least a passenger in the transportation vehicle. The fellow passenger can either be known to the user or an interested party as yet unknown to the user. In a first operation, a ride request of the fellow passenger or potential fellow passenger is received by the user, the user's transportation vehicle, or a communication terminal of the user. The ride request includes a definition of a starting position and a destination position of a desired route of the fellow passenger. The ride request does not need to be received directly by the user or the transportation vehicle, however. It can also be initially received via a stationary server, on which it is first filtered.

For example, the ride request can be filtered based on pre-defined references, which the potential providers of passenger rides or users of transportation vehicle have defined on the server. In a second operation, the ride request is automatically compared with a predefined or predicted route of the transportation vehicle. This operation can be carried out on the stationary server, on a user terminal of the user or on an evaluation unit of the user's transportation vehicle. In other words, the sequence of the reception of the ride request and the automatic comparison of the ride request is reversible. If the comparison is performed on a stationary server, the ride request can be forwarded to the user if and only if predefined references are relevant to the ride request which the user has defined to categorize a ride request as "of interest". If the references categorize the ride request as uninteresting to the user, the data communication requirement ("traffic") for transmitting the ride request to the user/the transportation vehicle is rendered unnecessary. If the ride request is forwarded to the user, his/her communication terminal or his/her transportation vehicle anyway and evaluated there, it will always be ensured that the most current references stored in the transportation vehicle are used for comparing the ride request against the predefined or predicted route of the transportation vehicle. Depending on a result of the comparison it is finally decided automatically on the basis of an existing reference whether the ride request will be submitted to the user or not. In other words, the server, the transportation vehicle or the user's communication terminal will decide whether or not the user is even bothered with the ride request. In this way, the acceptance of a disclosed method by users of transportation vehicles can be increased and therefore the number of participating users and fellow passengers can be increased.

The predefined reference can comprise, for example, a definition of a maximum detour accepted by the user. In other words, such things as which distance, or what amount of additional travel time the user will have to expend in picking up the fellow passenger, can be automatically determined. These expenditures may be defined, for example, as a proportion of a share of the cost to be paid by the potential fellow passenger. In other words, for example, the detour can be expressed as a proportion of a total distance from the starting position to the destination position. If the predefined reference defines additional exclusion criteria (e.g., avoidance of toll roads, ferry connections, poor-quality roads, etc.), then these conditions can also be taken into account in the automatic comparison of the ride request with the predefined route.

The detour that the user would have to accept due to giving a potential ride to the fellow passenger is made up of the detour which the user has to drive based on the starting position relative to their predefined/predicted route, and the detour which they have to drive as a result of their destination position with respect to their predefined/predicted route. Both detours are driven at different times and therefore can have different effects on the total travel time and/or the total travel costs. For example, it may be practical to drive a route (such as a motorway journey) between the starting position and the destination position as early in the day as possible, because an increase in the volume of traffic is to be expected with time. Similarly, a decrease in the volume of traffic may also be expected with time. Hence a different assessment of the detour based on the start position or on the destination position with respect to the predefined route may be appropriate. If the traffic development over time, the transport options and drivability of sections of the route (ferry connections, toll roads, night driving bans, etc.) are taken into account, a different assessment of the route based on the starting position compared to a detour based on the destination position may be appropriate.

Optionally, in response to the determination of an acceptance of the ride request by the user or automatically by the user terminal/transportation vehicle of the user, a route calculation from a current position of the transportation vehicle to the starting position can be started (for example, on the basis of current traffic conditions). It is possible at least to calculate a route and/or different routes, a time until arrival at the start position, etc. Optionally, the route guidance can be offered or even launched automatically. This eliminates the need for any interaction by the user to initiate a route calculation/guidance.

The reference by which the user can compare/review the ride request before a corresponding notice is issued to them can be defined according to different parameters. For example, the length of the predefined route (as described above) can be taken into account, for example, by expressing the length of the detour or the expected share of the cost to be paid by the fellow passenger as a proportion of the length of the already planned route. Alternatively or additionally, a calendar date (for example, a weekday, a holiday, a weekend day) and alternatively or additionally a time of day or a period in the day, can be used to decide whether the driver is prepared to accept the detour to collect or drop off the fellow passenger. For example, the driver may have a lower willingness to accept detours on a working day than on weekends/holidays. In addition, an occupation of the transportation vehicle (how many passengers does the driver have already?) can be used to decide on the willingness of the driver to accept detours. Optionally, a current configuration of the transportation vehicle (e.g., trailer towing, roof box mounted etc.) can also be periodically detected automatically and defined as a parameter of the reference. If a transportation vehicle or an account of a system/app are eligible for the submission of ride requests, then any potential user (for example, the keeper of the transportation vehicle and his/her spouse) can define different references. The identity of the user can be determined, for example, by sensors (e.g., on the basis of a wireless key, on the basis of a terminal carried by the user, etc.), and used for the comparison and decision about the ride request.

The user can be further assisted by a route calculation from the starting position to the destination position being started in response to the automatic detection of an arrival at the starting position. In other words, the ride request can be accepted by the user simply by their arrival at a start position. To save the user having to enter a navigation destination (destination position), the destination position received with the ride request can be defined as a new route destination and a route guidance to the destination position can be started (if necessary, after prior confirmation by the user).

In a similar way, in the case of an automatic detection of the arrival of the transportation vehicle at the destination position, an automatic route calculation can be started for the continuation of the predefined/predicted route, which the user intended to drive along regardless of the ride request. In other words, the user is returned to the predefined route via the fastest route after he/she has dropped off the fellow passenger at the destination position.

For example, the ride request can also comprise a desired time of departure at the starting position and/or a categorization of the person of the fellow passenger. The desired time of departure at the start position can be defined, for example, as less important (±3 hours) or important (±15 minutes). Accordingly, the reference can decide on the willingness of the user to travel their predefined route a little earlier or a little later. In a known way, categories of the person of the fellow passenger (male/female, smoker/non-smoker, pet owner etc.) can be used to decide whether the ride-share request will be submitted to the user or not.

According to a second disclosed embodiment, a device is proposed for assisting a user of a transportation vehicle in finding a suitable fellow passenger. The device comprises a data input (e.g., an antenna, a bus node, etc.) by which ride requests and, where appropriate, position information of the transportation vehicle/the user/potential fellow passenger can be determined. An evaluation unit (such as a programmable processor, an electronic control unit, etc.) is provided for receiving a ride request by the data input, the request comprising a definition of a desired start position and a desired destination position.

The ride request can additionally comprise a requested start time at the start position and/or a categorization of the potential fellow passenger making the request. The evaluation unit is configured to compare the ride request automatically against a predefined or predicted route of the transportation vehicle, and depending on a result of the comparison, to decide automatically based on a predefined reference whether or not the ride request is submitted to the user. In other words it is possible to avoid the user being confronted with ride requests that are of no interest to them. In other words, the disclosed device is configured to realize the features, feature combinations and the benefits of the disclosed method resulting from them, in a similar way sufficiently obviously that to avoid repetitions, reference is made to the above comments.

According to a third disclosed embodiment, a computer program product is proposed, which comprises instructions, which, when they are executed on a programmable evaluation unit of a device according to the disclosed embodiment, cause the evaluation unit to execute the operations of a method in accordance with the first disclosed embodiment. The computer program product can be implemented, for example, as a data memory, in particular, as a CD, DVD, Blue Ray disc, flash memory, RAM/ROM, etc.

According to a fourth disclosed embodiment, a signal sequence is proposed which represents instructions, which, when they are executed on a programmable evaluation unit of a device according to the second disclosed embodiment, cause the evaluation unit to execute the operations of an exemplary method in accordance with the first disclosed embodiment. The signal sequence represents the core idea of the present disclosure under protection, including the case in which the instructions necessary for the execution of the method operations are located on a data memory outside of the scope of the present claims.

According to a fifth disclosed embodiment, a transportation vehicle is proposed (for example, a car, a mini-van, truck, motorcycle, water-borne and/or airborne vehicle), which has a device in accordance with the second disclosed embodiment. The device can be, in particular, permanently installed in the transportation vehicle. In other words, it can be permanently integrated into the on-board power supply and/or information system of the transportation vehicle. It can use common hardware components with an on-board navigation system. The above comments are also referenced in relation to the transportation vehicle with regard to the features, feature combinations and benefits.

In the following text, disclosed embodiments are identified in illustrative combinations, without having a restrictive character.

For a disclosed transportation vehicle infotainment system, a dynamic driving service integration is proposed. In a separate request, the willingness of the driver is queried as to whether and, if appropriate, how often he/she would like to receive enquiries to take other people to a destination in his/her vicinity or on his/her route under predefined conditions. In at least one disclosed embodiment, on the basis of the acceptances and rejections, the system detects on which days, at what times of day and on which routes the driver is willing to give rides to other people. It is also conceivable for the driver to select the appropriate parameters with manual settings.

The transportation vehicle infotainment system is connected to the portal of a transportation vehicle manufacturer (or an operator) of a ride-sharing service. The portal therefore knows the location of all connected/registered transportation vehicles. If a destination for a navigation system has been entered or a likely destination in connection with a current position is known, this will be transferred to the portal. Alternatively, the data of a predictive navigation system are provided. The predictive navigation can also run in the backend in this case. If appropriate, this can be offered to the customer as an optional (paid-for) service.

A second user/fellow passenger requiring transport now submits a request to the transport service (portal) that he/she would like to get from a place X to a place Y (either now or at a pre-defined later time). The portal now searches for drivers and transportation vehicles located in the area (online) that are willing to accept ride-sharing services and have set preferences that are compatible with the request.

For example, a user can specify how often and when he/she offers ride-sharing services and what detour and/or time delay he/she is willing to accept. If there are no drivers available who are willing to perform the ride-sharing service, a corresponding piece of information is sent back to the requester and/or the request is forwarded to another service (possibly for a commission), e.g., Uber/Gett service; Taxi switchboard, or similar.

For example, a driver/user is located on a route to a personal destination A (predefined route). Via the transportation vehicle sensors and/or the data input by the driver, the infotainment system knows the destination (possibly data from predictive navigation) and the number of other people in the transportation vehicle (determined by sensors). Furthermore, additional data may be known from the appointment calendar of the driver and/or the other occupants of the transportation vehicle.

For example, the driver may have entered settings that he/she is only willing to offer transport when he/she is alone in the transportation vehicle, the detour is less than ten kilometers or the detour time is less than 30 minutes, a minimum distance of 10 km was requested by the fellow passenger, a time window between 07:00 and 20:00 on weekdays is not exceeded, and he/she is not on the way to a destination XYZ. If an appointment (e.g., ascertained from the user's personal appointment calendar) is predefined, he/she can define a minimum period of time (e.g., three minutes) by which the new arrival time at the venue precedes the start of the appointment. If no preference of the user is infringed, he/she will then receive an inquiry in the infotainment system as to whether he/she is in fact currently willing to pick up passengers. If the driver confirms the request, in the next operation he/she receives the inquiry as to whether they would like to transport a person from a location X to Y. In addition the following can be displayed:

1. Pick-up location of the passenger, destination of the passenger
2. Photo of the passenger and their rating from previous journeys
3. Detour: x kilometers, expected time delay
4. Arrival time at location X
5. Arrival time at location Y
6. Shared journey price in Euros
7. Do you want to accept the ride? Yes/No.

If the driver confirms the ride, the relevant data are transmitted to the requester, who if appropriate must confirm the payment data once again within a short period of time. On acceptance of the ride, the infotainment system automatically activates the navigation system or modifies an existing navigation operation and opens the appropriate screen.

The payment data can be determined from the desired journey route, the detour or a combination of both. For the mediation of the service, the service provider receives a commission.

In this proposal the driver is on the way to a personal destination and receives a transport request dynamically, wherein the data of the driver's navigation system, or its predictive route data, are input into the selection of the request. The driver and the requesting party must register in advance with the appropriate service and specify, for example, their contact details, payment information (e.g., credit card data, PayPal data), driving license data, transportation vehicle data etc. Using a rating system already known from the prior art, drivers, transportation vehicles and passengers can also be rated.

FIG. 1 shows a car 10 as a transportation vehicle, in which a user 1 has a disclosed device comprising a touchscreen 8, an electronic control unit 9 and a data memory 11, which is connected to the electronic control unit 9 for information transfer purposes. The touchscreen 8 is used for inputting and outputting information, which is processed or have been processed by the electronic control unit 9. The data storage 11 is configured to provide instructions for executing a disclosed method, as well as predefined references. Also connected to the electronic control unit 9 for information transfer is an antenna 7 as a data input, by which the car 10 can determine its own position and receive ride requests from a potential fellow passenger (not shown), which are matched against the predefined references of the user 1 by a stationary server 13 and, as appropriate, sent to the car 10 by a transmitter mast 12. The ego-position of the car 10 is determined by satellites 16 (only one shown). A smartphone 14 as a communication terminal of the user 1 is alternatively or additionally configured to execute the operations according to the method. The components "Touchscreen", "Evaluation Unit", "Data memory" and "Antenna" are such obviously essential components of a modern smartphone 14 that a detailed presentation of the same can be omitted.

Figure 2:
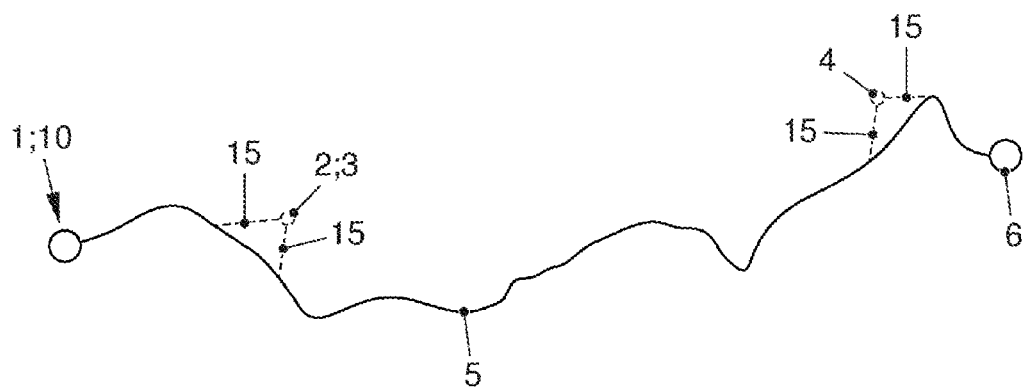
FIG. 2 is a schematic representation of a course of a predefined route of a user, and a starting position and a destination position of a potential fellow passenger.

FIG. 2 shows a course of a predefined route 5 between a current location of the user 1 or a transportation vehicle 10 and a final destination position 6 assigned to the predefined route 5. At a starting position 3 a fellow passenger 2 is located, who would like to be transported to a destination position 4. The route leading from the starting position 3 to the destination position runs largely along the predefined route 5 which the user 1 wants to drive anyway. To pick up the fellow passenger 2 at the starting position 3, the user 1 must make a detour 15 to the starting position 3, where he/she picks up the fellow passenger 2 and then arrives at the destination position 4 via a part of the predefined route 5 and a further detour 15. There, he/she drops off the fellow passenger 2 and drives via a detour 15 back to the predefined route 5 and ultimately to the final destination position 6.

Figure 3:
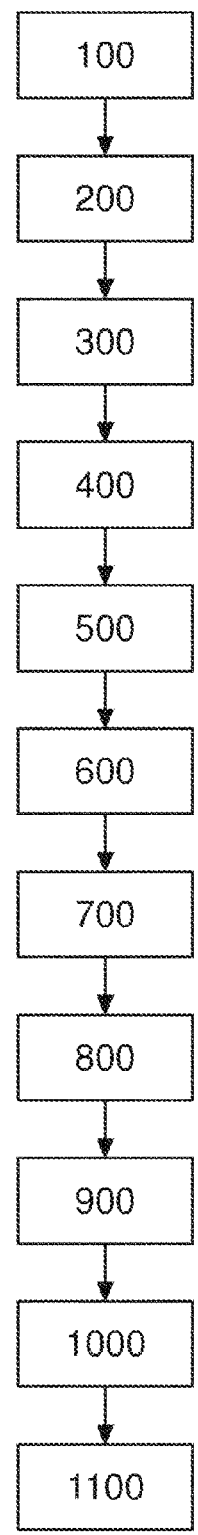
FIG. 3 a flow chart illustrating operations of an exemplary embodiment of a disclosed method for assisting a user in finding a suitable fellow passenger.

FIG. 3 shows a flow chart illustrating operations of a method for assisting a user of a transportation vehicle in finding a suitable fellow passenger. In operation at 100 a ride request comprising a definition of a starting position and a destination position is received on a server. Then in operation at 200, the ride request is automatically compared with a predefined, predicted route of the transportation vehicle. At this point, in operation at 300 a detour, which is obtained with respect to the predefined route based on the starting position, is evaluated. In addition, in operation at 400 a detour, which is obtained with respect to the predefined route based on the destination position, is evaluated. In operation at 500 it is decided automatically on the basis of a predefined reference whether the ride request will be submitted to the user or not. If the predefined reference evaluates the ride request as being of interest to the user and the user decides to accept the ride request, in operation at 600 an acceptance of the ride request by the user (in response to a user interaction or automatically) is determined and in response thereto, in operation at 700 a route calculation to determine the required travel time for the route and a route guidance to the starting position are launched. In operation at 800, an arrival at the starting position can be determined automatically and in response thereto, in operation at 900 a route calculation from the starting position to the destination position is started. The fellow passenger and the user drive along this route together. In operation at 1000 arrival at the destination position is automatically detected and finally, in response thereto, a route calculation for the continuation of the predefined route up to a final destination position is started in operation at 1100.

The present disclosure represents a more economic and ecologically sound option for the shared use of a transportation vehicle than previous ride sharing services (Uber, Gett etc.).

LIST OF REFERENCE NUMERALS

1 user
2 fellow passenger
3 starting position
4 destination position
5 predefined route
6 final destination position (of the predefined route)
7 antenna
8 touchscreen
9 electronic control unit
10 car
11 data store
12 transmission mast
13 stationary server
14 smartphone
15 detour
16 satellite
100-1100 method operations

The invention claimed is:

1. A method for a transportation vehicle traveling along a predefined route toward a final destination of the transportation vehicle, the method comprising: receiving, by an evaluation unit of the transportation vehicle, a ride request including a starting position definition indicating a starting position of a passenger and a destination position definition indicating a destination position of the passenger; comparing, by the evaluation unit, the ride request with the predefined route of the transportation vehicle, wherein comparing includes comparing to a threshold detour distance a total detour distance, wherein the threshold detour distance is indicative of a maximum detour distance previously selected by a user of the transportation vehicle, and wherein the total detour distance is the sum of the distance that the user has to drive based on the starting position relative to the predefined/predicted route, and the distance driven as a result of a destination position with respect to the predefined/predicted route; presenting, by the evaluation unit and based on the comparison, the ride request to the user on a display device of the transportation vehicle; and in response to receiving user input via the display device accepting the ride request, adjusting, by the evaluation unit, a next destination of the transportation vehicle to correspond to the starting position of the passenger.

2. The method of claim 1, wherein the automatic comparison takes place on a stationary evaluation unit and/or prior to the receipt of the ride request by the user and/or by the transportation vehicle.

3. The method of claim 1, wherein the comparing is also based on:
a length of the predefined route; and/or
a date; and/or
a time of day; and/or
an occupation of the transportation vehicle; and/or
a configuration of the transportation vehicle; and/or
an identity of the user of the transportation vehicle.

4. The method of claim 1, further comprising:
automatically determining an arrival at the starting position; and
in response thereto, starting a route calculation from the starting position to the destination position.

5. The method of claim 1, further comprising:
automatically detecting an arrival at the destination position; and
in response thereto, starting a route calculation for continuing the predefined route.

6. The method of claim 1, wherein the ride request also comprises a desired time of departure at the starting position and/or a categorization of the person of the fellow passenger.

7. A device for a transportation vehicle traveling along a predefined route toward a final destination of the transportation vehicle, the device comprising:
a data input; and
an evaluation unit communicatively coupled to the data input and configured to receive data signals therefrom, which include ride requests, wherein a ride request includes a starting position definition indicating a starting position of a passenger and a destination position definition indicating a destination position of the passenger,
wherein, in response to the data signal from the data input indicating that a ride request has been received compare the ride request with the predefined route of the transportation vehicle by comparing to a threshold detour distance a total detour distance,
wherein the threshold detour distance is indicative of a maximum detour distance previously selected by a user of the transportation vehicle, and
wherein the total detour distance is the sum of the distance that the user has to drive based on the starting position relative to the predefined/predicted route, and the distance driven as a result of a destination position with respect to the predefined/predicted route;
present, based on the comparison, the ride request to the user on a display device of the transportation vehicle, and in response to receiving user input via the display device accepting the ride request, adjust a next destination of the transportation vehicle to correspond to the starting position of the passenger.

8. A non-transitory computer program product comprising instructions selectively executable on a programmable evaluation unit of a device of a transportation vehicle, the device comprising:

a data input; and an evaluation unit communicatively coupled to the data input and configured to receive data signals therefrom, which include ride requests, wherein a ride request includes a starting position definition indicating a starting position of a passenger and a destination position definition indicating a destination position of the passenger, wherein, in response to the data signal from the data input indicating that a ride request has been received, compare the ride request with the predefined route of the transportation vehicle by comparing to a threshold detour distance a total detour distance, wherein the threshold detour distance is indicative of a maximum detour distance previously selected by a user of the transportation vehicle, and wherein the total detour distance is the sum of the distance that the user has to drive based on the starting position relative to the predefined/predicted route, and the distance driven as a result of a destination position with respect to the predefined/predicted route;

present, based on the comparison, the ride request to the user on a display device of the transportation vehicle, and in response to receiving user input via the display device accepting the ride request, adjust a next destination of the transportation vehicle to correspond to the starting position of the passenger.

9. A signal sequence representing instructions selectively executable on a programmable evaluation unit of a device of a transportation vehicle traveling along a predefined route toward a final destination of the transportation vehicle, the device comprising:

a data input; and an evaluation unit communicatively coupled to the data input and configured to receive data signals therefrom, which include ride requests, wherein a ride request includes a starting position definition indicating a starting position of a passenger and a destination position definition indicating a destination position of the passenger, wherein, in response to the data signal from the data input indicating that a ride request has been received, compare the ride request with the predefined route of the transportation vehicle by comparing to a threshold detour distance a total detour distance, wherein the threshold detour distance is indicative of a maximum detour distance previously selected by a user of the transportation vehicle, and wherein the total detour distance is the sum of the distance that the user has to drive based on the starting position relative to the predefined/predicted route, and the distance driven as a result of a destination position with respect to the predefined/predicted route;

present, based on the comparison, the ride request to the user on a display device of the transportation vehicle, and in response to receiving user input via the display device accepting the ride request, adjust a next destination of the transportation vehicle to correspond to the starting position of the passenger.

10. A transportation vehicle comprising a device for assisting a user of the transportation vehicle in finding a passenger, the device comprising:

a data input; and an evaluation unit communicatively coupled to the data input and configured to receive data signals therefrom, which include ride requests, wherein a ride request includes a starting position definition indicating a starting position of a passenger and a destination position definition indicating a destination position of the passenger, wherein, in response to the data signal from the data input indicating that a ride request has been received, compare the ride request with the predefined route of the transportation vehicle by comparing to a threshold detour distance a total detour distance, wherein the threshold detour distance is indicative of a maximum detour distance previously selected by a user of the transportation vehicle, and wherein the total detour distance is the sum of the distance that the user has to drive based on the starting position relative to the predefined/predicted route, and the distance driven as a result of a destination position with respect to the predefined/predicted route;

present, based on the comparison, the ride request to the user on a display device of the transportation vehicle, and in response to receiving user input via the display device accepting the ride request, adjust a next destination of the transportation vehicle to correspond to the starting position of the passenger.

11. The device of claim 7, wherein the evaluation unit is a stationary evaluation unit, and wherein the evaluation unit compares the ride request with the predefined route of the passenger prior to the ride request being received by the user and/or by the transportation vehicle.

12. The device of claim 7, wherein the comparing is based on at least one of a length of the predefined route, a date, a time of day, an occupation of the transportation vehicle, a configuration of the transportation vehicle, and an identity of the user of the transportation vehicle.

13. The device of claim 7, wherein the evaluation unit is configured to, in response to determining that the transportation vehicle arrived at the starting position, initiate calculating a route from the starting position to the destination position.

14. The device of claim 7, wherein the evaluation unit is configured to, in response to determining that the transportation vehicle arrived at the destination position, initiate calculating a route to continue along the predefined route.

15. The device of claim 7, wherein the ride request includes a desired time of departure at the starting position and/or a categorization of the passenger.

16. The device of claim 8, wherein the evaluation unit is a stationary evaluation unit, and wherein the evaluation unit compares the ride request with the predefined route of the passenger prior to the ride request being received by the user and/or by the transportation vehicle.

17. The device of claim 8, wherein the comparing is based on at least one of a length of the predefined route, a date, a time of day, an occupation of the transportation vehicle, a configuration of the transportation vehicle, and an identity of the user of the transportation vehicle.

18. The device of claim 8, wherein the evaluation unit is configured to, in response to detecting that the transportation vehicle arrived at the starting position, initiate a route calculation from the starting position to the destination position.

19. The device of claim 8, wherein the evaluation unit is configured to, in response to determining that the transportation vehicle arrived at the destination position, initiate calculating a route to continue along the predefined route.

20. The device of claim 8, wherein the ride request includes a desired time of departure at the starting position and/or a categorization of the passenger.

21. The device of claim 9, wherein the evaluation unit is configured to, in response to determining that the transportation vehicle arrived at the destination position, initiate calculating a route to continue along the predefined route.

22. The device of claim 9, wherein the ride request includes a desired time of departure at the starting position and/or a categorization of the passenger.

23. The device of claim 9, wherein the evaluation unit is configured to, in response to detecting that the transportation vehicle arrived at the starting position, initiate a route calculation from the starting position to the destination position.

24. The device of claim 9, wherein the evaluation unit is configured to, in response to detecting that the transportation vehicle arrived at the destination position, initiate a route calculation for continuing the predefined route.

25. The device of claim 9, wherein the ride request includes at least one of a desired time of departure from the starting position and an identity of the passenger.

26. The device of claim 10, wherein the evaluation unit is configured to, in response to determining that the transportation vehicle arrived at the destination position, initiate calculating a route to continue along the predefined route.

27. The device of claim 10, wherein the ride request includes a desired time of departure at the starting position and/or a categorization of the passenger.

28. The device of claim 10, wherein the evaluation unit is configured to, in response to detecting that the transportation vehicle arrived at the starting position, initiate a route calculation from the starting position to the destination position.

29. The device of claim 10, wherein the evaluation unit is configured to, in response to detecting that the transportation vehicle arrived at the destination position, initiate a route calculation for continuing the predefined route.

30. The device of claim 10, wherein the ride request includes at least one of a desired time of departure from the starting position and an identity of the passenger.

* * * * *